Feb. 23, 1960 M. J. REIDER 2,925,626
METHOD FOR PROVIDING LONG, SOFT VEGETABLE FIBERS
Filed April 28, 1954 2 Sheets-Sheet 1

INVENTOR.
MALCOLM J. REIDER
BY
ATTORNEYS

Feb. 23, 1960  M. J. REIDER  2,925,626
METHOD FOR PROVIDING LONG, SOFT VEGETABLE FIBERS
Filed April 28, 1954  2 Sheets-Sheet 2

INVENTOR.
MALCOLM J. REIDER
ATTORNEYS

United States Patent Office 2,925,626
Patented Feb. 23, 1960

2,925,626

METHOD FOR PROVIDING LONG, SOFT VEGETABLE FIBERS

Malcolm J. Reider, Shillington, Pa., assignor to Geo. W. Bollman & Co., Inc., Adamstown, Pa., a corporation of Pennsylvania Application April 28, 1954, Serial No. 426,255

4 Claims. (Cl. 19—7)

This invention relates to apparatus and a method for providing long, soft vegetable fibers. More specifically, this invention relates to apparatus and a method for isolating desirable long, soft vegetable fibers from undesirable plant tissues. The invention is applicable to kenaf, ramie, jute and their close botanical relatives.

Numerous processes have been devised for providing long, soft vegetable fibers. Generally speaking, the methods fall into two groups, i.e., bactericidal retting and mechanical defibering, or a combination of these methods. This invention involves an improvement over the prior art and utilizes a combination of chemical retting and mechanical defibering.

The heretofore known methods of acquiring such fibers have, generally speaking, been unsatisfactory on practical grounds. Thus, for example, bactericidal retting is not feasible where there is anything but a very low standard of living due to the fact that it is horribly malodorous and requires long times of treatment. Mechanical defibering has not been practical largely due to excessive breakage and loss of fiber. Serious attempts to produce such fibers on a practical large scale production line basis have been carried out unsuccessfully heretofore.

The importance of kenaf to the economy of the Western Hemisphere cannot be overestimated. Kenaf fiber can readily be substituted for jute. As is well known, enormous quantities of jute are utilized throughout the Western Hemisphere and jute is almost completely supplied from the Far East. In view of the enormous use of jute in the formation of packaging materials, industrial ropes and cordage and fabrics such as burlap, cutting the Western Hemisphere off from its source of jute would, without question, seriously cripple the economy of the Western Hemisphere in the absence of the satisfactory method of this invention for processing kenaf.

It is, therefore, the broad object of this invention to provide a method and apparatus for providing long, soft vegetable fibers.

It is an object of this invention to provide a method and apparatus whereby the processing of bark containing long, soft vegetable fibers can be greatly speeded up and satisfactorily accomplished on a mass production line.

Although, as pointed out above, the method and apparatus of this invention is applicable to, for example, kenaf, jute or ramie, it will be described below as applied to kenaf by way of example for the sake of simplicity and it will be understood that the invention is not so limited.

The method in accordance with this invention comprises laying up ribbons of kenaf bark, which may be either green or dried, on a conveyor system such that the ribbons are shingled, that is, they overlap the preceding ribbons. Preferably, each row of ribbons will overlap up to all but 4 to 12 inches of the preceding row of ribbons. The thus laid up stalks are then crushed, if green, to express excess juices and then treated with a retting solution. If dried ribbons are used, the crushing step is omitted.

The retting solution may be, for example, an aqueous solution containing from .25% to 5.0% of a soap which is preferably an alkali metal salt of an aliphatic straight chain fatty acid of from 6 to 18 carbon atoms. The aqueous soap solution will have a pH of from about 8.5 to about 13.5, which will preferably be achieved by the use of an excess of the alkaline material used to make the soap, i.e., that is by using, for example, an excess of sodium hydroxide or potassium hydroxide. If desired, from 0.1% to 2.0% of sodium sulfite can be utilized to improve the color of the kenaf fiber.

Exemplary of satisfactory soaps are sodium or potassium stearate, sodium or potassium oleate and sodium or potassium palmitate, sodium or potassium laurate, sodium or potassium caprylate, sodium or potassium soap of coconut oil fatty acids or tall oil fatty acids.

Anionic surface active agents, such as fatty alcohol sulfates or sulfonated petroleum hydrocarbons; and nonionic surface active agents, such as polyoxyethylene compounds, as for example, polyoxyethylene sorbitan mono-oleate and polyoxyethylene sorbitan monostearate may be substituted in aqueous solution for the above soaps, sufficient alkali being present to give a pH of about 8.5 to about 13.5.

The kenaf ribbons will be maintained in the chemical retting solution for from about ¼ to about one hour. If desired, during this period, preferably about half way through the retting period, the kenaf ribbons can be removed from the retting solution, crushed or squeezed and then again subjected to the identical or a similar retting solution.

After the retting period the kenaf ribbons are removed from the retting solution and spread out into substantially a single layer, that is, the overlapping or shingling is greatly reduced and preferably eliminated. The ribbons are then subjected to a scutching action on opposing sides of the ribbon, which separates the desired fiber from the unwanted vegetable matter. The thus separated vegetable matter and fiber are washed with water, squeezed to eliminate the water and dried.

If desired, after subjecting the ribbons to the scutching action described above, they can be wetted with the above described retting solution and subjected to a second scutching action operation and then washed and dried as before.

All aspects of the invention will be further clarified by the following description read in conjunction with the drawings in which.

Figure 1:
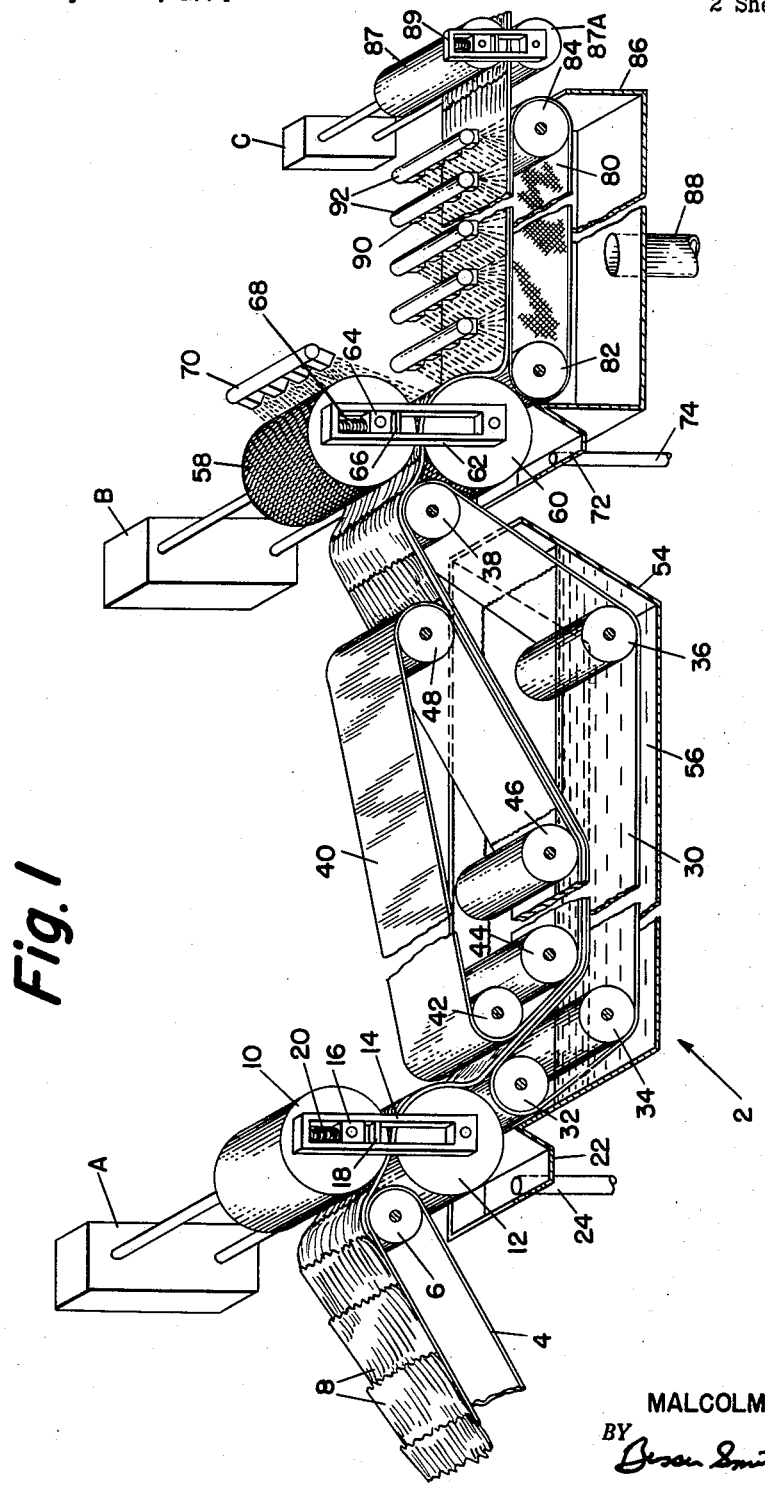
Figure 1 is a perspective view showing apparatus in accordance with this invention for carrying out the method of the invention.

Referring to Figure 1, apparatus 2 in accordance with this invention has an endless belt conveyor 4 carried at its upper end by roller 6. A plurality of rows of kenaf ribbons are shown on endless conveyor 4. It will be noted that rows 8 are disposed in an overlapping arrangement.

Adjacent roller 6 are opposed metal surfaced rollers 10 and 12. Roller 12 is journalled in support member 14 which also carries a bearing member 16 in which roller 10 is journalled. A stop 18, secured to member 14, limits the downward travel of bearing member 16. A coil spring 20 urges bearing member 16 downwardly so that roller 10 will exert the desired pressure. The opposite ends of rollers 10 and 12 are supported in an identical manner and, therefore, this need not be described or shown. Rollers 10 and 12 are driven at approximately the same speed by a conventional drive mechanism shown at A. Stop member 18 is set so that roller 10 will have a minimum clearance of from about .003 to about .015 inch and spring 20 is selected to provide a force sufficient to crush out the juices without cutting the fibers, preferably a force of about 250 lbs. to about 1000 lbs. per lineal inch. If dried kenaf is used, the stop is set higher to permit free passage of the kenaf.

It will be particularly noted that the upper surface of roller 6 is located above a horizontal plane passing between rollers 10 and 12 and that roller 6 is placed as close as possible to rollers 10 and 12. This arrangement greatly facilitates the transfer of the kenaf ribbons from conveyor 4 to the nip of rollers 10 and 12.

Below roller 12 is provided a catch basin 22 with a drain pipe 24 to carry away any falling liquid matter.

An endless conveyor 30 is carried by rollers 32, 34, 36 and 38, the linear speed of conveyor 30 being substantially the same as the linear speed of the rollers 10 and 12. Roller 32 is positioned with its upper surface lying in a horizontal plane passing below the center of roller 12. Further, roller 32 is placed as closed to roller 12 as practical.

An endless conveyor 40 is carried by rollers 42, 44, 46 and 48. Conveyors 30 and 40 are positioned so as to engage the kenaf ribbons and carry them through and out of tank 54 containing retting solution 56.

Adjacent roller 38 are opposed knurled rollers 58 and 60. Roller 60 is journalled in support member 62, which also slidably carries a bearing member 64 in which roller 58 is journalled. A stop member 66, secured to support member 62, limits the downward travel of bearing member 64. A coil spring 68 bears against the top of bearing member 64. It will be understood that the opposite sides of these rollers are similarly mounted.

It will be noted that the top of roller 38 lies above a horizontal plane passing between rollers 58 and 60 and that roller 38 is placed as close to rollers 58 and 60 as practical. Spray nozzles 70 direct water tangentially downwardly along the discharge side of roller 58 to prevent the kenaf ribbons from curling up about roller 58. A drip pan 72 is placed under roller 60 to catch any dripping liquid and is provided with a drain pipe 74.

Knurled rollers 58 and 60 are driven by drive mechanism, indicated at B, at a linear speed substantially faster than the linear speed of endless conveyors 30 and 40. Further, there is a speed differential between rollers 58 and 60 to provide a scutching action.

It is preferred to have the slower of rollers 58 and 60 driven at a linear speed of from 2 to 20 times the linear rate of endless conveyor 30, depending on the amount of overlap and length of the ribbons. One of rollers 58 or 60 will be driven preferably at a linear speed of from about 1.2 to about 5 times the speed of the other roller, it being immaterial which of the two rollers runs at the faster speed. Stop member 66 is set so that roller 58 will have a minimum clearance of from .003 to .015 inch and spring 68 is selected to provide a force of about 100 to about 900 pounds per lineal inch.

An endless perforate conveyor 80 of wire mesh screen is carried by rollers 82 and 84 and over a catch basin 86 having a drain pipe 88. Roller 82 is positioned closely adjacent roller 60 and with its upper surface lying below a horizontal plane passing through the center of roller 60.

Downwardly directed sprayheads 90 are supplied with water through pipes 92, to which they are connected.

Screen 80 has a linear speed slightly in excess of the speed of the faster of the rollers 58 or 60, preferably about 10% to about 20% faster.

Rubber squeeze rollers 87 and 87A, driven by driving mechanism indicated at C, are mounted in support 89, the roller 87 being carried in a bearing 91 forced downwardly by spring 93, the opposite ends (not shown) being similarly mounted.

Figure 2A:
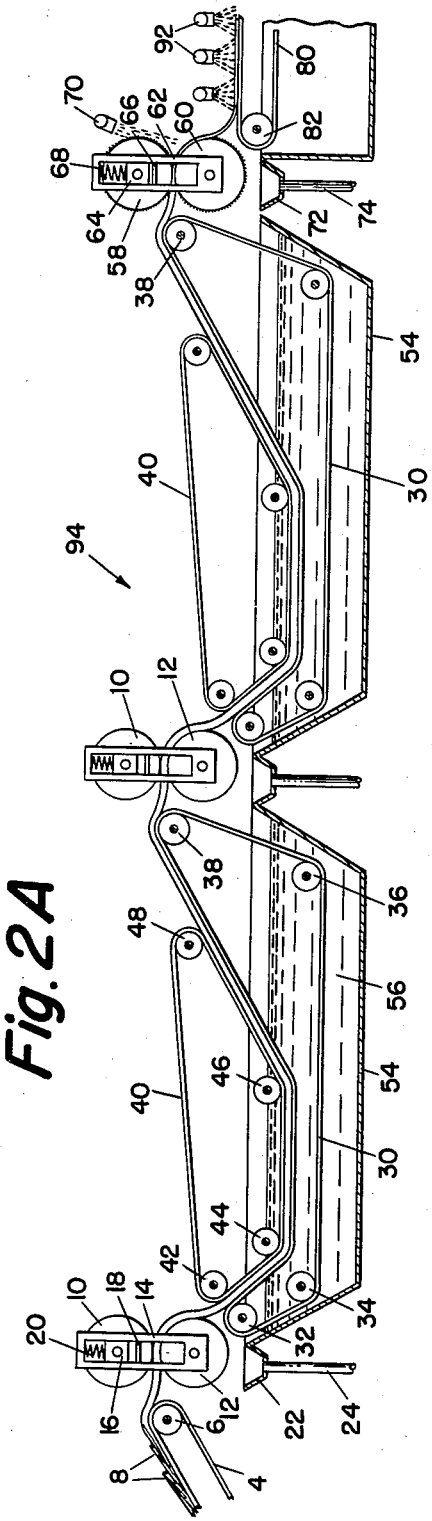
Figure 2A is a side elevation of the initial portion of alternative apparatus in accordance with this invention for carrying out the method of this invention.
Figure 2B:
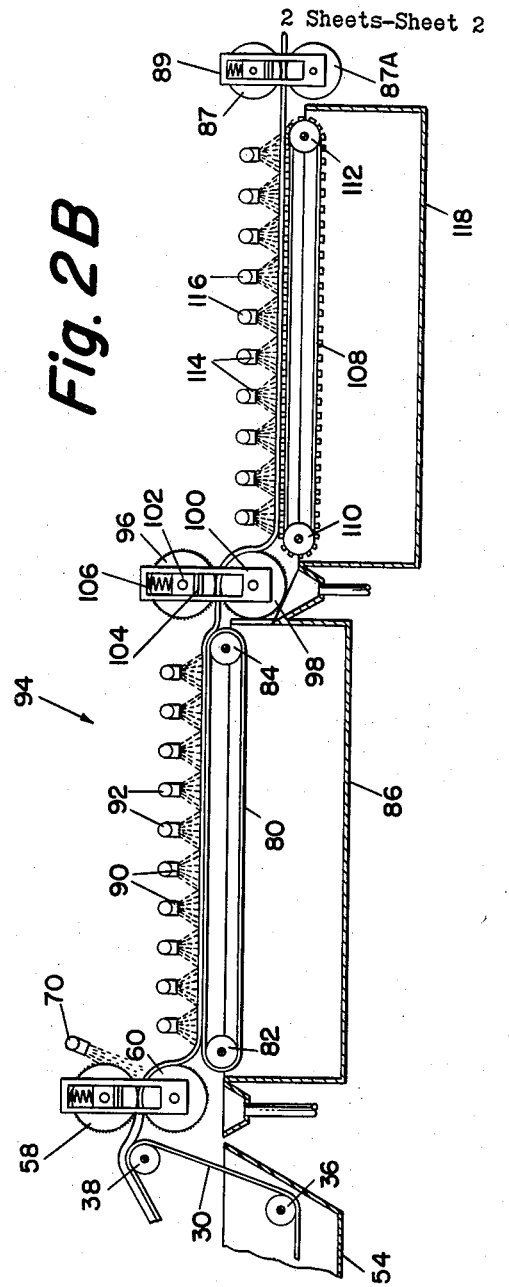
Figure 2B is a side elevation of the end portion of the alternative apparatus shown in part in Figure 2A.

An alternative embodiment is shown in Figures 2A and 2B. The apparatus 94 of Figures 2A and 2B simply represents a duplication of units utilized in the embodiment shown in Figure 1.

As shown in Figure 2A, rows 8 of kenaf ribbons are carried by a conveyor 4 and presented to rollers 10 and 12. There then follows hte section of apparatus 2 including from rollers 10 and 12 through conveyor 30 and roller 38. Following this mechanism, apparatus 94 is provided with a second section which is a duplicate of the apparatus between rollers 10 and 12 and through roller 38.

Following the second conveyor and roller 38, apparatus 94 has the mechanism of Figure 1 extending from rollers 58 and 60 to the end of endless screen conveyor 80 and catch basin 86, but a retting solution as described above is sprayed in lieu of water.

At the end of catch basin 86 apparatus 94 is provided with a pair of opposed knurled rollers 96 and 98. Roller 98 is journalled in a support member 100, which also slidably carries a bearing member 102 which supports roller 96.

Stop 104 limits the downward travel of bearing member 102. Spring 106 urges bearing member 102 downwardly. Stop member 104 is preferably set to provide a clearance .003 to .015 inch to rollers 96 and 98 and spring 106 preferably provides a downward force of 100 to 1000 pounds per lineal inch. The opposite ends (not shown) of rollers 96 and 98 are similarly mounted.

Roller 96 has a linear speed approximately the same as that of the preceding screen conveyor 80. Roller 96 has a linear speed of from about 1.2 to about 5 times the linear speed of roller 98. If desired, the relative speed of rollers 96 and 98 can be reversed with roller 96 having a higher linear speed than roller 98. Rollers 96 and 98 provide a scutching action to separate and clean any fibers which were not so treated by the previous action of rollers 58 and 60.

Following rollers 96 and 98 apparatus 94 has an endless perforate conveyor 108 formed by transverse slats spaced to provide drainage action, which is carried by rollers 110 and 112. Sprayheads 114 connected to water pipes 116 provide a downwardly directed spray of water. A catch basin 118 is located below screen 108.

Conveyor 108 has a linear speed somewhat higher than the linear speed of roller 98 in order to straighten out the material entrained thereon and particularly to prevent the fibers from sticking down between the slats. Rubber squeeze rollers 87 and 87A are provided at the discharge end of conveyor 108.

In carrying out the method and operating the apparatus in accordance with this invention as disclosed in Figure 1, the green kenaf ribbons are shingled on conveyor 4 and passed through rollers 10 and 12, which crush the ribbons. If dried kenaf is used, it is permitted to pass freely between these rollers so as to avoid breakage by raising stops 18. The placement of roller 6 with its upper surface above the nip of rollers 10 and 12 provides for a smooth flow of kenaf ribbons from conveyor 4 through rollers 10 and 12.

The kenaf ribbons are then carried into tank 54 by conveyors 30 and 40. The placement of roller 32 with its upper surface below a horizontal plane passing through the center of roller 12 has been found to greatly improve the conveyance of the ribbons. Conveyors 30 and 40 have a linear speed which will maintain the ribbons in the retting solution in tank 54 for from about 10 to about 120 minutes. The ribbons are then conveyed to pass between rollers 58 and 60, roller 38 being positioned in a manner similar to roller 6 to provide effective transfer of the ribbons from conveyor 30 to the nip of rollers 58 and 60. Since both rollers 58 and 60 have a linear speed higher than that of conveyor 30, the rows of kenaf ribbons are spread out, preferably sufficiently to form a single layer rather than overlapping.

The differential speed between rollers 58 and 60 provides a scutching action which separates the usable fibers from the unusable vegetable matter. The separated kenaf material assisted by a water spray from spray nozzle 70 passes downwardly on to screen 80. Screen 80 having a linear speed slightly higher than the highest linear speed of either rollers 58 or 60, tends to straighten out the fibrous material deposited on the screen and prevents it from sticking down between the wires of the screen. Water from sprayheads 90 thoroughly washes the fiber free of undesired vegetable matter on the screen 80 and the washed product is squeezed by rollers 87 and 87A to eliminate water.

Operation of the apparatus of Figure 2 is obvious from the description of the operation of the apparatus of Figure 1, one difference being that the retting operation is divided in half with a crushing and squeezing step by the second set of rollers 10 and 12 taking place. A further difference is that after the first washing with water the treated material is subjected to a squeezing and scutching action by rollers 96 and 98 and then again washed with water. In addition, nozzles 92 preferably are used to deliver a spray of retting solution as previously defined or a simple conventional detergent solution.

What is claimed is:

1. The method of treating ribbons of bark containing long, soft vegetable fibers to provide long, soft vegetable fibers, which comprises overlapping substantially parallel ribbons of bark containing long, soft vegetable fibers and continuously conveying said overlapped ribbons through a retting solution, said overlapping substantially increasing the density of the ribbons in the direction of conveyance to decrease the time required to ret a given quantity of ribbons, decreasing the overlap between said ribbons to permit scutching and simultaneously subjecting said ribbons to a scutching action and washing the separated soft vegetable fibers.

2. The method of treating ribbons of bark containing long, soft vegetable fibers to provide long, soft vegetable fibers, which comprises overlapping substantially parallel ribbons of bark containing long, soft vegetable fibers and continuously conveying said overlapped ribbons through an aqueous alkaline soap retting solution for from about one-quarter to about one hour, said overlapping substantially increasing the density of the ribbons in the direction of conveyance to decrease the time required to ret a given quantity of ribbons, decreasing the overlap between said ribbons to permit scutching and simultaneously subjecting said ribbons to a scutching action and washing the separated soft vegetable fibers.

3. The method of treating ribbons of bark containing long, soft vegetable fibers to provide long, soft vegetable fibers, which comprises overlapping substantially parallel ribbons of bark containing long, soft vegetable fibers, crushing said overlapped ribbons and continuously conveying said crushed ribbons through a retting solution, said overlapping substantially increasing the density of the ribbons in the direction of conveyance to decrease the time required to ret a given quantity of ribbons, decreasing the overlap between said ribbons to permit scutching and simultaneously subjecting said ribbons to a scutching action and washing the separated soft vegetable fibers.

4. The method of treating ribbons of bark containing long, soft vegetable fibers to provide long, soft vegetable fibers, which comprises overlapping substantially parallel ribbons of bark containing long, soft vegetable fibers, crushing said overlapped ribbons and continuously conveying said crushed ribbons through an aqueous alkaline soap retting solution for from about one-quarter to about one hour, said overlapping substantially increasing the density of the ribbons in the direction of conveyance to decrease the time required to ret a given quantity of ribbons, decreasing the overlap between said ribbons to permit scutching and simultaneously subjecting said ribbons to a scutching action and washing the separated soft vegetable fibers.

References Cited in the file of this patent

UNITED STATES PATENTS

| Number | Name | Date |
|---|---|---|
| 13,412 | Koch | Aug. 7, 1855 |
| 279,435 | Roberts | June 12, 1883 |
| 535,665 | Boyle | Mar. 12, 1895 |
| 1,277,185 | Brown | Aug. 27, 1918 |
| 1,757,349 | Von Ehrenthal et al. | May 6, 1930 |
| 2,070,273 | Haughey | Feb. 9, 1937 |
| 2,551,128 | Hulfish et al. | May 1, 1951 |
| 2,551,129 | Hulfish et al. | May 1, 1951 |
| 2,605,510 | Bernhart | Aug. 5, 1952 |
| 2,706,312 | Bobkowicz | Apr. 9, 1955 |
| 2,721,358 | Litvan et al. | Oct. 25, 1955 |
| 2,725,598 | Gardella | Dec. 6, 1955 |

FOREIGN PATENTS

| Number | Country | Date |
|---|---|---|
| 15,656 | Australia | Mar. 28, 1935 |